US012596925B2

(12) United States Patent     (10) Patent No.:    US 12,596,925 B2

Yu et al.                         (45) Date of Patent:       Apr. 7, 2026

(54) SINGLE-STAGE MODEL TRAINING FOR NEURAL ARCHITECTURE SEARCH

(71) Applicant: Google LLC, Mountain View, CA (US)

(72) Inventors: Jiahui Yu, Jersey City, NJ (US); Pengchong Jin, Mountain View, CA (US); Hanxiao Liu, Santa Clara, CA (US); Gabriel Mintzer Bender, Mountain View, CA (US); Pieter-Jan Kindermans, Zurich (CH); Mingxing Tan, Newark, CA (US); Xiaodan Song, San Jose, CA (US); Ruoming Pang, New York, NY (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 364 days.

(21) Appl. No.: 17/613,773

(22) PCT Filed: Mar. 5, 2021

(86) PCT No.: PCT/US2021/021234
§ 371 (c)(1),
(2) Date: Nov. 23, 2021

(87) PCT Pub. No.: WO2021/178916

PCT Pub. Date: Sep. 10, 2021

(65) Prior Publication Data

US 2022/0405579 A1     Dec. 22, 2022

Related U.S. Application Data

(60) Provisional application No. 62/985,856, filed on Mar. 5, 2020.

(51) Int. Cl.
*G06N 3/08*       (2023.01)
*G06N 3/045*     (2023.01)
(Continued)

(52) U.S. Cl.
CPC ............... *G06N 3/08* (2013.01); *G06N 3/045* (2023.01); *G06N 3/084* (2013.01); *G06N 3/086* (2013.01); *G06N 3/0985* (2023.01); *G06N 3/082* (2013.01)

(58) Field of Classification Search
CPC .......... G06N 3/08; G06N 3/045; G06N 3/084; G06N 3/086; G06N 3/0985; G06N 3/082
See application file for complete search history.

(56) References Cited

U.S. PATENT DOCUMENTS

| | | | | |
|---|---|---|---|---|
| 9,443,517 | B1 * | 9/2016 | Foerster | ................. G10L 15/08 |
| 2008/0262823 | A1 * | 10/2008 | Oslake | ..................... G06F 8/20 |
| | | | | 703/22 |

(Continued)

OTHER PUBLICATIONS

Vivienne Sze et al., "Efficient Processing of Deep Neural Networks: A Tutorial and Survey", Aug. 13, 2017, ARXIV 1703.09039v2, 32 pages (Year: 2017).*

(Continued)

*Primary Examiner* — Omar F Fernandez Rivas
*Assistant Examiner* — Shamcy Alghazzy
(74) *Attorney, Agent, or Firm* — Fish & Richardson P.C.

(57) ABSTRACT

Methods, systems, and apparatus, including computer programs encoded on computer storage media, for selecting a neural network to perform a particular machine learning task while satisfying a set of constraints.

20 Claims, 5 Drawing Sheets

Selected
Neural Network 150

Neural Architecture
Search System 100

Neural Networks 120

Shared Parameters 140

Training Data 102   Constraints 130

(51) Int. Cl.
$$\begin{array}{ll} G06N\ 3/082 & (2023.01) \\ G06N\ 3/084 & (2023.01) \\ G06N\ 3/086 & (2023.01) \\ G06N\ 3/0985 & (2023.01) \end{array}$$

(56) References Cited

U.S. PATENT DOCUMENTS

2016/0174902 A1* 6/2016 Georgescu ........... G06V 10/454
600/408
2019/0354837 A1 11/2019 Zhou et al.
2021/0089887 A1* 3/2021 Johnson ................. G06N 3/084
2022/0108177 A1* 4/2022 Samek .................. G06N 3/045

OTHER PUBLICATIONS

Max Jaderberg et al., "Population Based Training of Neural Networks", Nov. 28, 2017, ARXIV 1711.09846v2, 21 pages (Year: 2017).*
Michael Nielsen, "Neural Networks and Deep Learning", 2015, Determination Press (Year: 2015).*
Amirmohammad Rooshenas et al., "Search-Guided, Lightly-supervised Training of Structured Prediction Energy Networks", Dec. 22, 2018, ARXIV 1812.09603v1 (Year: 2018).*
Nathaniel J. Smith, "Why does calloc exist?", Dec. 5, 2016, njs blog (Year: 2016).*
Max Jaderberg et al., "Population Based Training of Neural Networks", Nov. 28, 2017, ARXIV 1711.09846v2, 21 pages, as attached in Non-Final (Year: 2017).*
Michael Nielsen, "Neural Networks and Deep Learning", 2015, Determination Press , as attached in Non-Final (Year: 2015).*
Amirmohammad Rooshenas et al., "Search-Guided, Lightly-supervised Training of Structured Prediction Energy Networks", Dec. 22, 2018, ARXIV 1812.09603v1, as attached in Non-Final (Year: 2018).*
Nathaniel J. Smith, "Why does calloc exist?", Dec. 5, 2016, njs blog, as attached in Non-Final (Year: 2016).*
Efficient Embedded Machine Learning applications (Year: 2020).*
Architecture Search by Estimation of Network Structure Distributions (Year: 2019).*
Bender et al., "Can Weight Sharing Outperform Random Architecture Search? An Investigation With TuNAS," Proceedings of the IEEE/CVF Conference on Computer Vision and Pattern Recognition (CVPR), Jun. 2020, pp. 14323-14332.
Bender et al., "Understanding and Simplifying One-Shot Architecture Search," Proceedings of the 35th International Conference on Machine Learning, Jul. 15, 2018, 10 pages.
Brock et al., "SMASH: One-shot model architecture search through hypernetworks," Presented at Sixth International Conference on Learning Representations, Vancouver, Canada, Apr. 30-May 3, 2018, 22 pages.
Cai et al., "Once for all: Train one network and specialize it for efficient deployment," arXiv, Aug. 26, 2019, 11 pages.
Cai et al., "ProxylessNAS: Direct Neural Architecture Search on Target Task and Hardware," arXiv, Dec. 2, 2018, 13 pages.
Cubuk et al., "AutoAugment: Learning Augmentation Policies from Data," arXiv, Oct. 9, 2018, 14 pages.
Deng et al., "Imagenet: A large-scale hierarchical image database," Presented at 2009 IEEE Conference on Computer Vision and Pattern Recognition, Miami, FL, USA Jun. 20-25, 2009, pp. 248-255.
Goyal et al., "Accurate, Large Minibatch SGD: Training ImageNet in 1 Hour," arXiv, Jun. 8, 2017, 12 pages.
Guo et al., "Single Path One-Shot Neural Architecture Search with Uniform Sampling," arXiv, Apr. 6, 2019, 14 pages.
He et al., "Bag of tricks for image classification with convolutional neural networks," Proceedings of the IEEE/CVF Conference on Computer Vision and Pattern Recognition (CVPR), Jun. 2019, pp. 558-567.

He et al., "Deep residual learning for image recognition," Proceedings of the IEEE Conference on Computer Vision and Pattern Recognition (CVPR), Jun. 2016, pp. 770-778.
He et al., "Delving Deep into Rectifiers: Surpassing Human-Level Performance on ImageNet Classification," Proceedings of the IEEE International Conference on Computer Vision (ICCV), Dec. 2015, pp. 1026-1034.
He et al., "Identity Mappings in Deep Residual Networks," European Conference on Computer Vision, 2016, pp. 630-645.
Hinton et al., "Distilling the knowledge in neural network," arXiv, Mar. 9, 2015, 9 pages.
Howard et al., "MobileNets: Efficient Convolutional Neural Networks for Mobile Vision Applications," arXiv, Apr. 17, 2017, 9 pages.
Howard et al., "Searching for MobileNetV3," arXiv, Nov. 20, 2019, 11 pages.
International Preliminary Report on Patentability in International Appln. No. PCT/US2021/021234, dated Sep. 15, 2022, 11 pages.
International Search Report and Written Opinion in International Appln. No. PCT/US2021/021234, dated Jul. 5, 2021, 13 pages.
Ioffe et al., "Batch Normalization: Accelerating Deep Network Training by Reducing Internal Covariate Shift," Proceedings of the 32nd International Conference on Machine Learning, 2015, 9 pages.
Liu et al., "DARTS: Differentiable Architecture Search," arXiv, Jun. 24, 2018, 12 pages.
Liu et al., "Hierarchical Representations for Efficient Architecture Search," arXiv, Nov. 1, 2017, 13 pages.
Liu et al., "Progressive Neural Architecture Search," Proceedings of the European Conference on Computer Vision (ECCV), Sep. 2018, 16 pages.
Loshchilov et al., "SGDR: Stochastic Gradient Descent with Restarts," arXiv, Aug. 17, 2016, 9 pages.
Ma et al., "ShuffleNet V2: Practical Guidelines for Efficient CNN Architecture Design," Proceedings of the European Conference on Computer Vision (ECCV), Sep. 2018, 16 pages.
openreview.net [online], "Scaling up neural architecture search with big single-stage models," Sep. 25, 2019, retrieved on Aug. 22, 2022, retrieved from URL<https://openreview.net/forum?id=HJe7unNFDH>, 13 pages.
Pham et al., "Efficient Neural Architecture Search via Parameters Sharing," Proceedings of the 35th International Conference on Machine Learning, 2018, 10 pages.
Ramachandran et al., "Searching for Activation Functions," arXiv, Oct. 27, 2017, 13 pages.
Real et al., "Regularized Evolution for Image Classifier Architecture Search," AAAI Technical Track: Machine Learning, Jul. 17, 2019, pp. 4780-4789.
Sandler et al., "Inverted residuals and linear bottlenecks: Mobile networks for classification, detection and segmentation," arXiv, Jan. 16, 2018, 14 pages.
Srivastava et al., "Dropout: A simple way to prevent neural networks from overfitting," Journal of Machine Learning Research, Jun. 2014, 15:1929-1958.
Stamoulis et al., "Single-Path NAS: Designing Hardware-Efficient ConvNets in Less Than 4 Hours," arXiv, Apr. 5, 2019.
Tan et al., "EfficientNet: Rethinking Model Scaling for Convolutional Neural Networks," Proceedings of the 36th International Conference on Machine Learning, 2019, 10 pages.
Tan et al., "Mnasnet: Platform-aware neural architecture search for mobile," Proceedings of the IEEE/CVF Conference on Computer Vision and Pattern Recognition (CVPR), Jun. 2019, pp. 2820-2828.
Wu et al., "FBNet: Hardware-Aware Efficient ConvNet Design via Differentiable Neural Architecture Search," Proceedings of the IEEE/CVF Conference on Computer Vision and Pattern Recognition (CVPR), Jun. 2019, pp. 10734-10742.
Yu et al., "BigNAS: Scaling up neural architecture search with big single-stage models," arXiv, Mar. 24, 2020, 20 pages.
Yu et al., "Network Slimming by Slimmable Networks: Towards One-Shot Architecture Search for Channel Numbers," arXiv, Mar. 27, 2019, 10 pages.
Yu et al., "Slimmable neural networks," arXiv, Dec. 21, 2018, 12 pages.

(56) References Cited

OTHER PUBLICATIONS

Yu et al., "Universally Slimmable Networks and Improved Training Techniques," Proceedings of the IEEE/CVF International Conference on Computer Vision (ICCV), Oct. 2019, pp. 1803-1811.

Zoph et al., "Learning Transferable Architectures for Scalable Image Recognition," Proceedings of the IEEE Conference on Computer Vision and Pattern Recognition (CVPR), Jun. 2018, pp. 8697-8710.

Zoph et al., "Neural Architecture Search with Reinforcement Learning," arXiv, Nov. 5, 2016, 15 pages.

* cited by examiner

| Identify initial neural network based on performance benchmarks <u>402</u> |
| :---: |

| Generate modified neural networks <u>404</u> |
| :---: |

| Determine performance benchmarks <u>406</u> |
| :---: |

| Select neural network <u>408</u> |
| :---: |

SINGLE-STAGE MODEL TRAINING FOR NEURAL ARCHITECTURE SEARCH

CROSS-REFERENCE TO RELATED APPLICATION

This application is a national phase entry under 35 U.S.C. 371 of PCT Application Serial No. PCT/US2021/021234, filed on Mar. 5, 2021, which claims priority to U.S. patent application Ser. No. 62/985,856, filed on Mar. 5, 2020. The entirety of each of the foregoing is incorporated by reference.

BACKGROUND

This specification relates to selecting a neural network for performing a machine learning task.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations that selects a neural network for performing a particular machine learning task.

More specifically, the system determines an architecture for a neural network that performs the machine learning task within a specified set of resource constraints. That is, the resource constraints specify constraints on how many computational resources are consumed by the neural network when performing the task.

Particular embodiments of the subject matter described in this specification can be implemented so as to realize one or more of the following advantages.

Performing machine learning tasks on devices with limited computational resources, e.g., mobile devices, smart devices, or other edge devices, requires neural network architectures that are both accurate and computationally efficient. For example, the same specific neural network architecture can require more than an order of magnitude more inference time if it is deployed on a slower device. Furthermore, even two devices which have similar overall speeds (e.g. smartphone CPUs made by different manufacturers) can favor very different neural network architectures due to hardware and device driver differences. Consequently, particular embodiments described in this specification are motivated by considerations relating to how to determine neural network architectures of varying sizes that are optimized for specific devices having particular hardware resource constraints, and how to achieve effective deployment of such models on such devices.

The described techniques can be used to search for neural network architectures for neural networks that can perform the task while satisfying resource constraints on resource consumption and to therefore identify a single architecture or a range of architectures that can be deployed effectively on edge devices for any given machine learning task.

Moreover, some existing techniques for searching for such architectures first train a large neural network to determine a single set of shared weights and then then identify a path through the network (a subset of its operations) which gives the best possible accuracy while satisfying a user-specified latency constraint for a specific hardware device. Thus, the large neural network can be used to rank many different candidate architectures from a user-defined search space. However, the absolute accuracies of the candidate architectures that are obtained from this super-network are typically much lower than those of the same models trained from scratch in stand-alone fashion. For this reason, existing techniques require significant post-processing of the super-network's weights to obtain high-quality accuracies for model deployment. In particular, the selected candidates need significant additional training before being able to attain acceptable quality on the task when deployed.

By training the large neural network using the techniques described in this specification and then performing model selection using the techniques described in this specification, the system can determine a network architecture that achieves or even exceeds state of the art performance on any of a variety of machine learning tasks given a user specified resource constraint without requiring any post-processing of the weights of the trained large neural network, i.e., without requiring any fine-tuning or re-training. Thus, the computationally intensive and time consuming post-processing required by conventional techniques is eliminated without any negative impact (and in fact many cases a positive impact) on the performance of the final, deployed neural network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that selects a neural network for performing a particular machine learning task.

Figure 1:
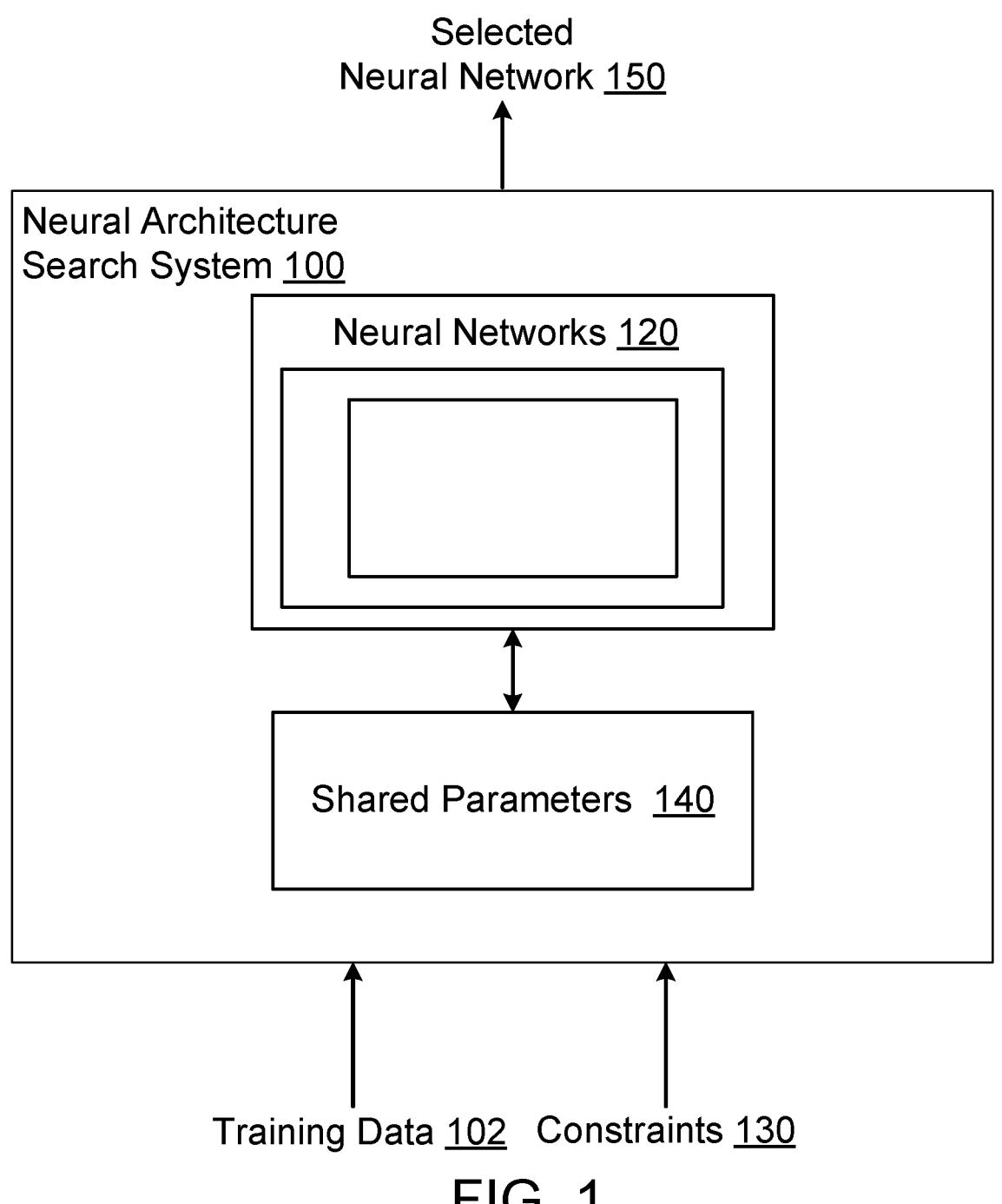
FIG. 1 shows an example neural architecture search system.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that obtains training data 102 for a particular machine learning task and selects a neural network 150 for performing the task.

Generally, the training data 102 includes a set of neural network inputs and, for each network input, a respective target output that should be generated by the neural network to perform the particular task.

The system 100 can receive the training data 102 in any of a variety of ways. For example, the system 100 can receive training data as an upload from a remote user of the system over a data communication network, e.g., using an application programming interface (API) made available by the system 100. As another example, the system 100 can receive an input from a user specifying which data that is already maintained by the system 100 should be used for training the neural network.

More specifically, the system 100 uses the training data 102 to generate trained values for a shared set of parameters 140.

The shared set of parameters is shared between a plurality of neural networks 120 that each have architectures selected from a search space that is defined by a plurality of architectural dimensions. In other words, each different architecture in the search space has a different combination of values for the plurality of architectural dimensions from each other architecture in the search space. More specifically, each of the neural networks 120 has parameters that are a subset of the shared set, with different neural networks 120 having different subsets of the shared set.

Generally, the architecture defines the number of layers in the neural network, the operations performed by each of the layers, and the connectivity between the layers in the neural network, i.e., which layers receive inputs from which other layers in the neural network. Thus, the possible values for the architectural dimensions define one or more of the aspects of the architecture of the neural network, with any aspects that are not defined by the architectural dimensions being fixed, i.e., the same for all of the neural networks 120. Specific examples of architectural dimensions are described below.

After determining the trained values for the shared set of parameters, the system 100 determines a neural network 150 that performs the machine learning task within a specified set of resource constraints 130. That is, the resource constraints 130 specify constraints on how many computational resources are consumed by the neural network when performing the task when deployed on a target set of hardware devices.

For example, the system 100 can receive an input from a user of the system that specifies the set of resource constraints 130 or can automatically determine the set of resource constraints 130 based on the computational resources that are available to the system 100 for performing inference, i.e., for processing new inputs for the particular task after the architecture has been determined.

As an example, the constraints can include constraints on one or more of the following: floating point operations per second (FLOPS) performed by the neural network while performing the task, the memory footprint of the neural network when deployed for performing the task, runtime latency of the neural network for performing an inference for an input or a batch of inputs when deployed on a device, and so on.

More specifically, the constraints can specify one or more of the following: a maximum number of FLOPS or an acceptable range of FLOPS for computing the task on a new input, a maximum amount of memory or an acceptable range of memory consumed by the deployed neural network, a maximum latency or an acceptable latency range for performing an inference for an input or a batch of inputs when deployed on a particular device, and so on.

As a particular example, the constraints can be constraints on any of the above when deployed on a target set of one or more hardware devices that are specified in the input to the system. As one example, the target set of one or more hardware devices can be a single, specific edge device, e.g., a mobile phone, a smart speaker, or other edge device. As another example, the target set of one or more hardware devices can be a set of one or more hardware accelerator devices, e.g., ASICs, FPGAs, or tensor processing units (TPUs) on a real-world agent, e.g., a vehicle, e.g., a self-driving car, or a robot. As yet another example, the target set of one or more hardware accelerator devices can be a set of hardware accelerators in a data center. Thus, using the techniques described below, the system 100 can effectively select a neural network to be deployed on a specified target set of one or more devices while satisfying the one or more constraints.

The constraints can also include constraints on task performance, e.g., a minimum accuracy or other quality measure that should be achieved by the neural network as measured on the validation set.

The system 100 then selects a neural network that has a proper subset of the shared set of parameters 140 and that satisfies the constraints 130 as the neural network 150 to be used for performing the task.

The system 100 can then provide data specifying the trained parameter values of the neural network 150, e.g., for deployment for performing the neural network task on one or more hardware devices, e.g., through an API provided by the system 100. Alternatively or in addition, the system 100 can deploy the selected neural network 150 on one or more hardware devices and use the selected neural network 150 to process new network inputs received at the one or more devices.

Advantageously, once the system 100 has determined trained values of the shared set of parameters 140, the system can select the neural network 150 and deploy the neural network 150 (or provide the data specifying the neural network 150) on the set of target devices without performing any additional training.

The machine learning task can be any appropriate task that requires generating any kind of classification or regression output.

In some cases, the task is some kind of image processing task and the neural network is a convolutional neural network that is configured to receive an input image and to process the input image to generate a network output for the input image.

For example, the task may be image classification and the output generated by the neural network for a given image may be scores for each of a set of object categories, with each score representing an estimated likelihood that the image contains an image of an object belonging to the category.

As another example, the task can be image embedding generation and the output generated by the neural network can be a numeric embedding of the input image.

As yet another example, the task can be object detection and the output generated by the neural network can identify locations, e.g., bounding boxes or other regions, in the input image at which particular types of objects are depicted.

As yet another example, the task can be image segmentation and the output generated by the neural network can define for each pixel of the input image which of multiple categories the pixel belongs to.

When the neural network is a convolutional neural network, the plurality of architectural dimensions can include two or more of: input resolution dimension, network depth dimension (i.e., respective numbers of layers in each stage of the neural network), kernel size of each layer in the neural network, and number of channels of the convolutional layers in the neural network. Thus, each different convolutional neural network will have a different value for one or more of the above dimensions from any other convolutional neural network in the search space.

More specifically, the network architectures can be made up of a stack of residual blocks ("MB-Conv"), e.g., inverted bottleneck residual blocks, preceded by an initial convolutional layer and followed by a convolutional layer and one or more output layers that are configured to generate the output for the image processing task. Optionally, one or more additional components can be inserted within one or more of the blocks, e.g., a squeeze-and-excitation module. An example of a search space and possible ranges for the architectural dimensions are summarized in Table 1 below.

TABLE 1

| MobileNetV2-based search space. | | | | | |
|---|---|---|---|---|---|
| Stage | Operator | Resolution | # Channels | # Layers | Kernel Sizes |
| | Conv | 192 × 192-320 × 320 | 32-40 | 1 | 3 |
| 1 | MBConv1 | 96 × 96-160 × 160 | 16-24 | 1-2 | 3 |
| 2 | MBConv6 | 96 × 96-160 × 160 | 24-32 | 2-3 | 3 |
| 3 | MBConv6 | 48 × 48-80 × 80 | 40-48 | 2-3 | 3, 5 |
| 4 | MBConv6 | 24 × 24-40 × 40 | 80-88 | 2-4 | 3, 5 |
| 5 | MBConv6 | 12 × 12-20 × 20 | 112-128 | 2-6 | 3, 5 |
| 6 | MBConv6 | 12 × 12-20 × 20 | 192-216 | 2-6 | 3, 5 |
| 7 | MBConv6 | 6 × 6-10 × 10 | 320-352 | 1-2 | 3, 5 |
| | Conv | 6 × 6-10 × 10 | 1280-1408 | 1 | 1 |

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

Figure 2:
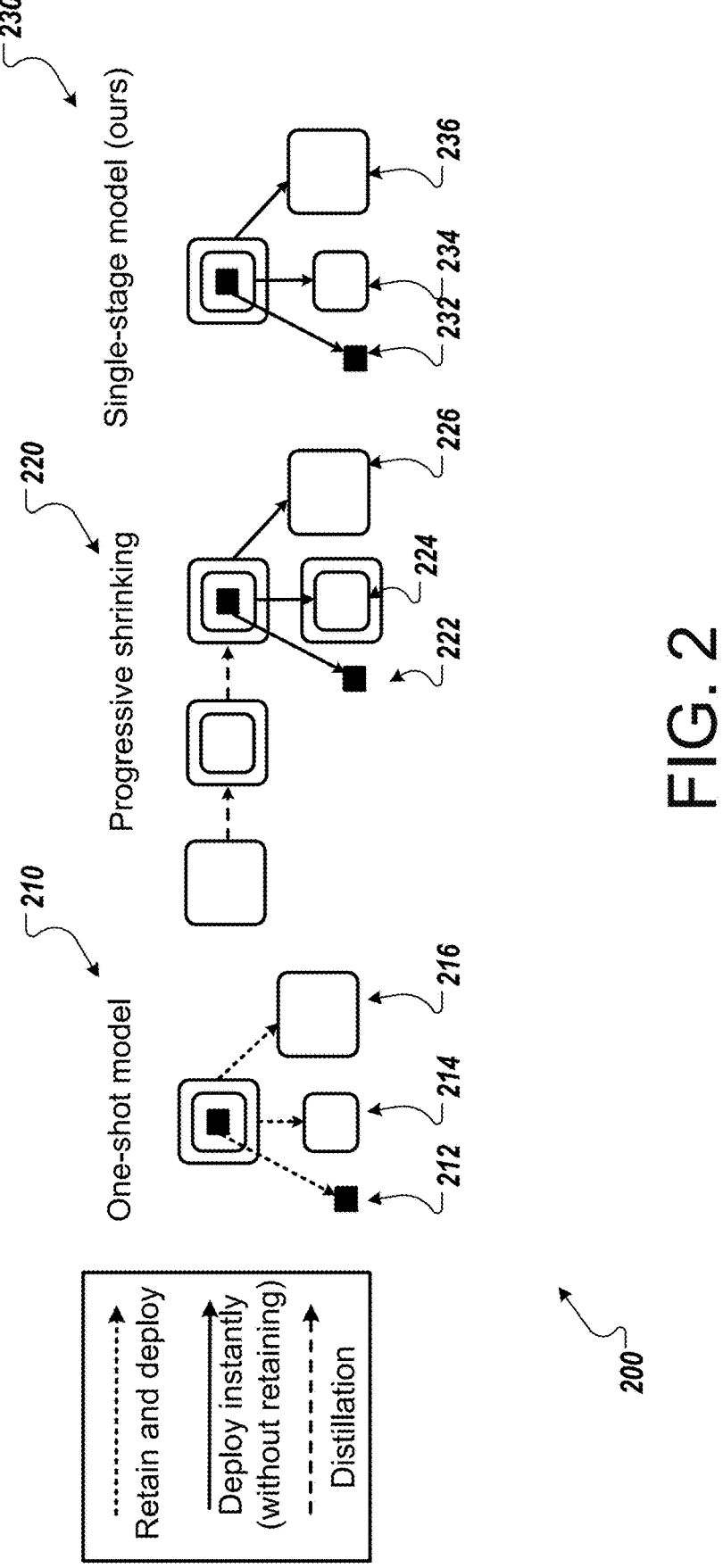
FIG. 2 is a diagram that shows the described architecture search techniques as compared to two other architecture search techniques.

FIG. 2 is a diagram 200 that shows the described architecture search techniques as compared to two other architecture search techniques.

In the "one-shot model" technique 210, like in the described technique, a plurality of neural networks that each have parameters that are a subset of a shared set of parameters are trained simultaneously. After training, a neural network that satisfies a specified set of constraints can be selected and then deployed. For example, FIG. 2 shows neural networks 212, 214, and 216 that satisfy three different sets of constraints. However, in the technique 210, once a neural network has been selected, the neural network needs to be re-trained before it can be deployed to effectively perform the machine learning task.

In the progressive shrinking technique 220, a large neural network is trained and then progressively distilled to obtain smaller neural networks through additional training. After training, any of the distilled neural networks can be deployed to satisfy a set of constraints. For example, FIG. 2 shows that three different neural networks 222, 224, and 226 can be deployed to satisfy three different sets of constraints. However, this approach requires sequential distillation, i.e., sequential training, of the smaller neural networks.

Thus, both technique 210 and technique 220 require multiple stages of training before a neural network can be effectively deployed.

In the described technique 230, referred to as "single-stage model" in FIG. 2, the plurality of neural networks that each have parameters that are a subset of a shared set of parameters are trained simultaneously. After training, a neural network that satisfies a specified set of constraints can be selected and then deployed. For example, FIG. 2 shows neural networks 232, 234, and 236 that satisfy three different sets of constraints. However, once a neural network has been selected, the neural network does not need any additional training to effectively perform the machine learning task.

In other words, because of the techniques described below with reference to FIGS. 3-5 for training the set of neural networks and then selecting a neural network once the set of neural networks have been trained, the system can effectively select a neural network using only a single training stage, instead of requiring multiple different training stages like the techniques 220 and 230.

Figure 3:
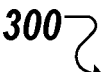
FIG. 3 is a flow diagram of an example process for selecting a neural network to be deployed for performing a machine learning task.
Figure 3:
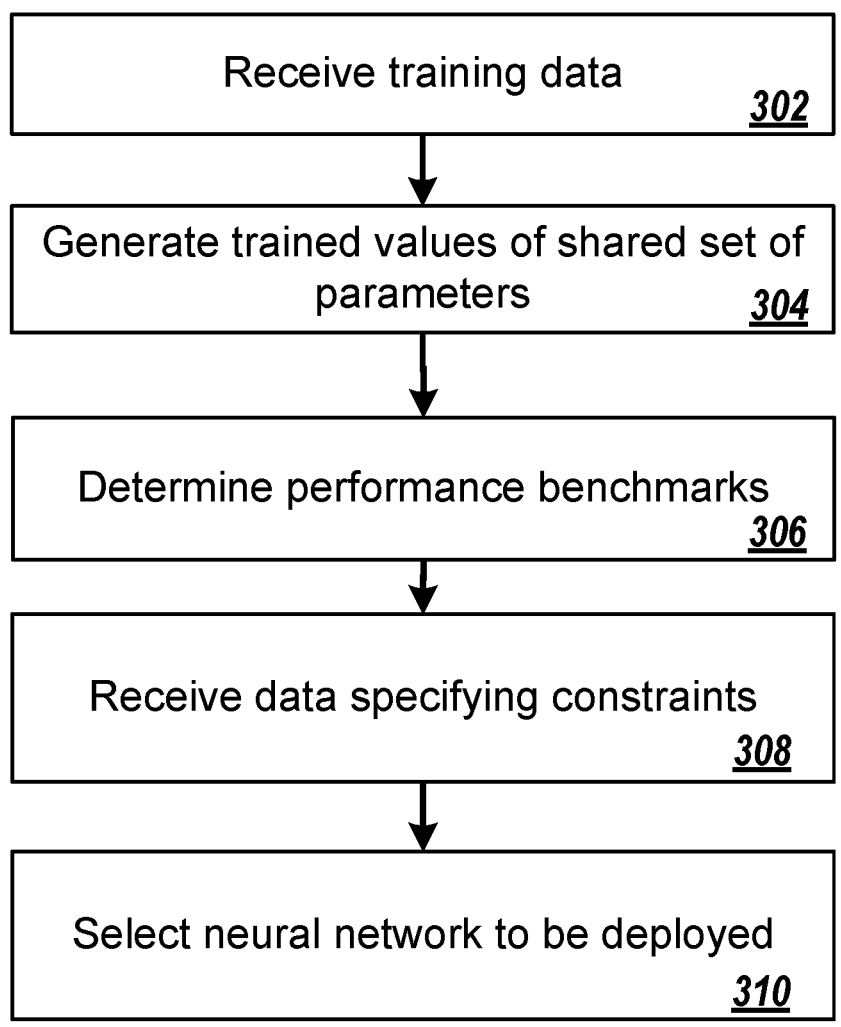

FIG. 3 is a flow diagram of an example process 300 for selecting a neural network to be deployed for performing a machine learning task. For convenience, the process 300 will be described as being performed by a system of one or more computers located in one or more locations. For example, a neural architecture search system, e.g., the neural architecture search system 100 of FIG. 1, appropriately programmed, can perform the process 300.

The system receives training data for a particular machine learning task (step 302).

The system generates trained values for a shared set of parameters by training a plurality of neural networks jointly on the training data (step 304). As described above, each of the plurality of neural networks has parameters that are a subset of the shared set and each of the plurality of neural networks has a respective architecture selected from a search space of different architectures that is defined by a respective set of possible values for each of a plurality of architectural dimensions. Thus, a different neural network can be generated by selecting a different combination of values for the architectural dimensions.

The system determines a respective performance benchmark on the machine learning task for each of a subset of the neural networks (step 306). Each neural network in the subset has a respective architecture selected from a proper subset of the search space of different architectures. To determine the respective performance benchmark for a neural network, the system can determine an accuracy or other appropriate performance measure for the machine learning task on a data set, e.g., some of or all of the training data set or a validation data set.

The system receives data specifying one or more constraints on computational resource consumption for performing the particular machine learning task (step 308).

In some implementations, the system performs step 308 after performing step 306 and only determines performance benchmarks for neural networks that satisfy the constraints. For example, the system can select a proper subset of the possible values for each of the architectural dimensions and then determine a performance benchmark for each combination of the proper subsets that yields a neural network that satisfies the constraints.

The system can determine whether a given neural network satisfies the constraints by, e.g., deploying the neural network on one or more target devices, e.g., a mobile phone, a smart speaker, or other edge device, or a set of one or more hardware accelerator devices, that are specified by the received constraints, performing one or more inference steps on the device using the neural network, i.e., processing one or more new inputs using the neural network while deployed on the device, and measuring the relevant quantities, e.g., FLOPS or latency, for the one or more inference steps and determining whether the relevant quantities satisfy the constraints. Alternatively, the system can make use of a hardware simulator that simulates the target hardware device to simulate the effect of deploying the neural network on the target device to determine estimates for the relevant quantities.

In some other implementations, the system performs step 306 independently of step 308. For example, the system can select a proper subset of the possible values for each of the architectural dimensions and then determine a performance benchmark for each combination of the proper subsets, i.e., regardless of whether the combination yields a neural network that satisfies the constraints. This can allow the system to later efficiently select a different neural network in response to receiving data specifying different constraints.

The system selects a neural network to be deployed for performing the machine learning task (step 310). In particular, the system selects a neural network that can be deployed to perform the machine learning task without needing to be re-trained and that satisfies the specified constraints. Selecting the neural network is described in more detail below with reference to FIG. 4.

Once the system has selected the neural network, the system or another system can deploy the selected neural network for performing the particular machine learning task. In particular, the system or the other system can deploy the selected neural network with values of the parameters of the selected neural network that are the same as the trained values determined by training the plurality of neural networks jointly, i.e., without further training the selected neural network.

Thus, the system can deploy a "single-stage" model, i.e., a model that has been trained using only a single stage of training, unlike other multi-stage approaches. This can significantly reduce the computational resources consumed by the process of selecting and training a neural network to perform the task while satisfying the specified constraints.

Figure 4:
FIG. 4 is a flow diagram of another example process for selecting a neural network to be deployed for performing a machine learning task.
Figure 4:
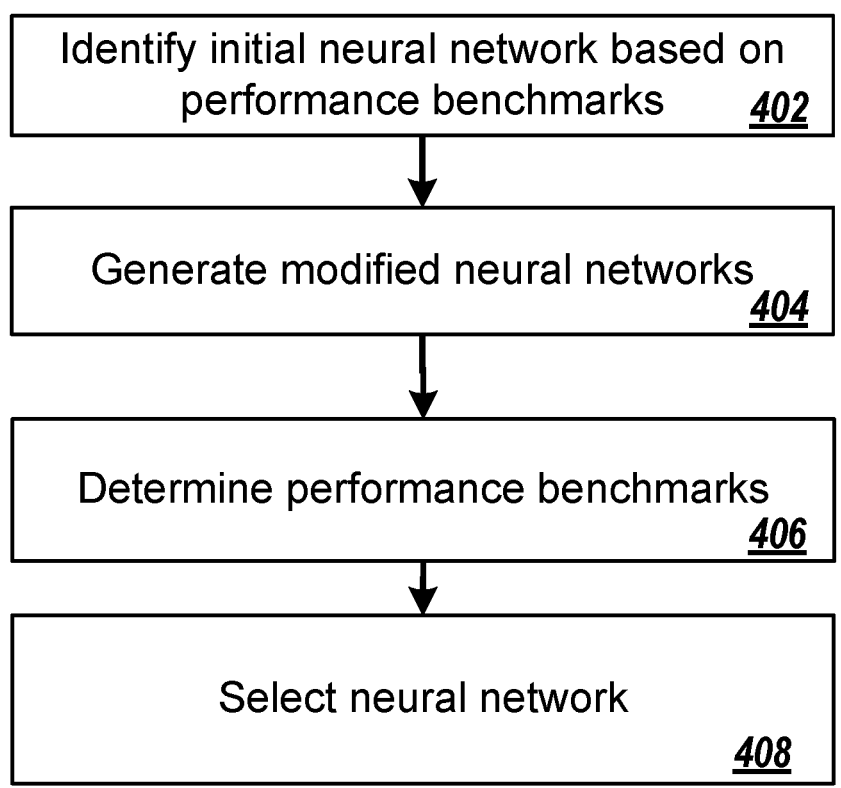

FIG. 4 is a flow diagram of another example process 400 for selecting a neural network to be deployed for performing a machine learning task. For convenience, the process 400 will be described as being performed by a system of one or more computers located in one or more locations. For example, a neural architecture search system, e.g., the neural architecture search system 100 of FIG. 1, appropriately programmed, can perform the process 400.

The system identifies, from the neural networks for which performance benchmarks have been computed and that satisfy the one or more constraints, an initial neural network based on the respective performance benchmarks (step 402). For example, the system can select the neural network that has the best performance benchmark.

The system generates a plurality of modified neural networks by perturbing the architecture of the identified initial neural network (step 404). In other words, the system generates each modified neural network by applying a different perturbation to the architecture of the identified neural network.

More specifically, as described above, each neural network is defined by respective values for each of the plurality of architectural dimensions and, therefore, the identified neural network is defined by respective "identified" values for each of the plurality of architectural dimensions. To generate a given modified neural network, the system can randomly adjust one or more of the respective identified values. As a particular example, the system can randomly vary the identified values of each of the plurality of architectural dimensions or randomly sample a subset of the plurality of architectural dimensions and then vary the identified values in the sampled subset.

Because of the way the neural networks are trained, when perturbing the initial neural network, the system can generate modified architectures that accept input sizes (or otherwise have values for one or more of the architectural dimensions) that do not match any of the neural networks that were trained to generate the trained values of the shared set of parameters. Nonetheless, the system can evaluate the mutated neural networks without additional training because the parameters are shared across all of the neural networks in the search space.

The system determines a respective performance benchmark on the particular machine learning task for each of the modified neural networks (step 406). As described above, to determine the respective performance benchmark for a neural network, the system can determine the accuracy or other appropriate performance measure for the machine learning task on a data set, e.g., the training data set or a validation data set.

Because steps 404 and 406 are independent for each modified architecture that is generated and independent of training, the system can, in some implementations, parallelize the performance of steps 404 and 406 across multiple different hardware devices in order to effectively evaluate a large number of mutated architectures.

The system selects, from the plurality of modified neural networks and the identified initial neural network, a neural network based on the respective performance benchmarks (step 408). In particular, the system can select the neural network having the best performance benchmark from among the modified neural networks and the identified neural network.

Figure 5:
FIG. 5 is a flow diagram of an example process for performing a training step during the training the plurality of neural networks.
Figure 5:
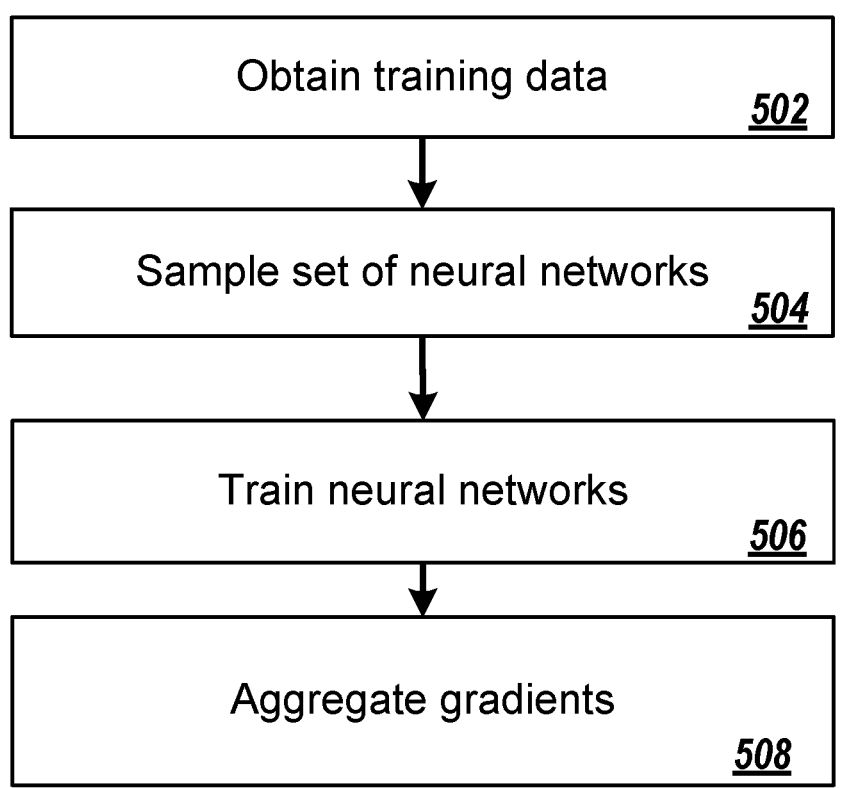

FIG. 5 is a flow diagram of an example process 500 for performing a training step during the training the plurality of neural networks. For convenience, the process 400 will be described as being performed by a system of one or more computers located in one or more locations. For example, a neural architecture search system, e.g., the neural architecture search system 100 of FIG. 1, appropriately programmed, can perform the process 500.

The system can repeatedly perform the process 500 to determine the trained values of the parameters in the shared set of parameters. In other words, the system can repeatedly perform training steps until some criterion is satisfied, e.g., a specified number of training steps have been performed or a specified amount of time has elapsed.

The system obtains training data for the training step (step 502). For example, the system can sample the training data from a larger set of training data. The training data for the training step includes a plurality of target inputs and, for each training input, a respective target output, i.e., an output that should be generated by performing the particular task on the training input.

The system samples a set of neural networks from the plurality of neural networks that are being trained (step 504). In particular, the system selects a proper subset of the neural networks that are being trained.

In some implementations, the system samples a fixed number of neural networks from the set of neural networks at random, i.e., by randomly selecting values for each of the architectural dimensions.

In some other implementations, however, the system samples a set of neural networks that is made up of the largest possible neural network in the search space, the smallest possible neural network in the search space, and N, e.g., two, four, eight, or twenty, randomly sampled neural networks from the search space. That is, the system trains the largest possible and smallest possible neural networks at every training step, and then samples the remainder of the neural network to be trained at the training step at random.

Generally, the largest possible neural network that has the most parameters of any neural network in the search space, e.g., a neural network that has all of the shared set of parameters. In other words, the largest possible neural network corresponds to a pre-determined set of values for the architectural parameters that yield a neural network that has been determined to be the largest possible.

In some cases, the smallest possible neural network is the neural network that has the fewest parameters of any neural network in the search. In particular, in the example search space described above for image processing tasks, the smallest possible neural network is the one with lowest input resolution, thinnest width, shallowest depth, and smallest kernel size (the kernel of the depthwise convolutions in each residual block). In other words, more generally, the smallest possible neural network corresponds to a pre-determined set of values for the architectural parameters that yield a neural network that has been determined to be the smallest possible.

By training the neural networks in this manner, the system can improve all neural networks in the search space simultaneously, by pushing up both the performance lower bound (the smallest possible neural network) and the performance upper bound (the largest possible neural network) across all neural networks.

The system trains the sampled set of neural networks on the training data for the training step to determine, for each neural network in the sampled set, a respective gradient with respect to the parameters from the shared set that are included in the neural network (step 506).

In some implementations, the system trains each neural network using the target outputs in the training data, i.e., by computing gradients of an objective function that measures an error between the network outputs generated by the neural network for the training inputs and the target outputs for the training inputs. The objective function can be any objective function that is appropriate for the particular task, e.g., a cross-entropy loss, a mean squared error loss, or a log likelihood objective.

In some other implementations, however, the system trains only the largest possible neural network using target outputs from the training data, i.e., to optimize the objective function that is appropriate for the task.

For each neural network in the sampled set other than the largest possible neural network, the system uses, as target outputs for the training of the neural network, outputs generated by the largest possible neural network during the training. That is, the system processes each training input using the largest possible neural network to generate a respective predicted output for each training input and then trains each other neural network using the predicted outputs, i.e., by computing gradients of a distillation objective function that measures an error between the network outputs generated by the neural network for the training inputs and the predicted outputs generated by the largest possible neural network. Making use of this distillation training allows the other sampled neural networks to make use of the larger knowledge capacity of the largest possible neural network. Moreover, because the largest possible neural network is always trained at every training step, the system can make use of this distillation training without any extra computational overhead, i.e., because the predicted outputs are always generated to train the largest possible neural network and can then be re-used for training the other neural networks without any additional computation.

When the task is an image processing task and the input resolution dimension is being varied, during training, input images can be randomly cropped as a preliminary data augmentation step. When distilling a high-resolution teacher model into a low-resolution student model, the same image patches are fed into both the teacher and the student. To do this, the system first randomly crops an image with a fixed resolution, and then applies bicubic interpolation to the same patch to transform it into all target resolutions (e.g., 192, 288, 320, etc.) for all of the neural networks in the sampled set.

In some implementations, the system can apply regularization during the training. As a particular example, the system can apply regularization to only the largest possible neural network, i.e., by regularizing the largest possible neural network without regularizing any of the other neural networks in the sampled set. The system can apply this regularization using any appropriate regularization technique, e.g., weight decay or dropout. Applying regularization only to the training can improve the performance of the training, e.g., relative to applying regularization to all of the neural networks, in part because larger models tend to overfit to the training data while smaller models underfit and because the other models are trained using distillation and never have access to the actual ground truth target output from the training data.

The system aggregates the gradients determined for the set of neural networks to determine an update to the shared set of parameters (step 508). In particular, for each parameter that is shared between two or more of the neural networks in the sampled set, the system can aggregate, e.g., sum or average, the gradient for that parameter for the two or more neural network. The system can then apply the aggregated gradients to the parameters, e.g., by applying an optimizer to the aggregated gradients to determine an update and then subtracting the update from or adding the update to the parameters.

By repeatedly updating the shared set of parameters using the process 500, the system can train the shared set of parameters so that any of a variety of choices for the architectural parameters result in a high performing neural network on the machine learning task.

As described above, in some cases the neural networks in the space are convolutional neural networks or other neural networks that include residual connections between layer blocks. In these cases, when initializing the values of the shared set of parameters prior to first iteration of the process 500, the system can initialize the output of each residual block (before skip connection) to an all-zeros tensor. For example, the system can accomplish this by setting the learnable scaling coefficient $\gamma=0$ in the last Batch Normalization layer of each residual block, ensuring identical variance before and after each residual block. This initialization can assist in stabilizing the training of the shared set of parameters, resulting in a higher performing set of parameters after training.

Because different sized neural networks are being trained, different sized neural networks can converge at different times during the training. For example, at a given training step t when the performance of big models peaks, the small models may not be fully-trained; and at training step t0 when the small models have better performance, the big models already may have already over fit the training set. In some implementations, to address this the system can use a learning rate schedule in which the learning rate is exponentially decayed with constant ending during training. In this schedule, the system exponentially decays the learning rate starting from an initial rate until the learning rate reaches some fixed proportion, e.g., three, five or ten percent, of the initial learning rate. After this, the system keeps the learning rate fixed. This brings two benefits. First, with a slightly larger learning rate at the end relative to conventional approaches, the small models learn faster. Second, the constant learning rate at the end alleviates the overfitting of big models as the weights oscillate.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving training data for a particular machine learning task;

generating trained values for a shared set of parameters by training a plurality of neural networks jointly on the training data, wherein each of the plurality of neural networks has parameters that are a subset of the shared set, wherein each of the plurality of neural networks has a respective architecture selected from a search space of different architectures, and wherein the search space is defined by a respective set of possible values for each of a plurality of architectural dimensions, and wherein the joint training comprises performing the following at each of a plurality of training steps:

obtaining training data for the training step;

sampling a plurality of neural networks of different sizes from the plurality of neural networks being trained, wherein each sampled neural network has a different subset of the shared set of parameters;

training the sampled neural networks on the training data for the training step to determine, for each sampled neural network, gradients with respect the respective subset of the shared set of parameters that are included in the sampled neural network; and aggregating the gradients determined for the set of neural networks to determine an update to the shared set of parameters, comprising, for each parameter that is shared between two or more of the sampled neural networks, aggregating the gradients with respect to the parameter for the two or more sampled neural networks;

determining a respective performance benchmark on the machine learning task for each of a subset of neural networks, each neural network in the subset having a different architecture selected from a proper subset of the search space of different architectures;

receiving data specifying one or more constraints on computational resource consumption for performing inference on one or more inputs for the particular machine learning task on a particular set of one or more target hardware devices; and selecting a neural network to be deployed for performing the machine learning task, comprising:

identifying, from the neural networks in the subset that satisfy the one or more constraints, an initial neural network based on the respective performance benchmarks;

generating a plurality of modified neural networks by perturbing the architecture of the identified initial neural network;

determining a respective performance benchmark on the particular machine learning task for each of the modified neural networks, and selecting, from the identified neural network and the plurality of modified neural networks generated by perturbing the architecture of the identified initial neural network, a neural network based on the respective performance benchmarks; and providing the selected neural network for performing inference on the particular set of one or more target hardware devices.

2. The method of claim 1, wherein the one or more constraints comprise one or more constraints on one or more of: floating point operations per second performed by a device when performing the task using the neural network, a memory footprint of the neural network when deployed on a device for performing the task, or a runtime latency of a device when performing an inference for an input or a batch of inputs using the neural network.

3. The method of claim 1, wherein the one or more constraints specify one or more of a maximum number of floating point operations per second or an acceptable range of memory consumed by a device when performing the task using the neural network, or a maximum latency or an acceptable latency range of a device when performing an inference for an input or a batch of inputs using the neural network.

4. The method of claim 1, wherein the constraint is a hardware-specific constraint on computational resource consumption for a particular device.

5. The method of claim 1, wherein providing the selected neural network for performing inference on the particular set of one or more target hardware devices comprises deploying the selected neural network with values of the parameters of the selected neural network that are the same as the trained values determined by training the plurality of neural networks jointly.

6. The method of claim 1, wherein the selected neural network has an architecture defined by respective first values for each of the plurality of architectural dimensions and wherein generating a plurality of modified neural networks comprises:

randomly adjusting one or more of the respective first values to generate a modified architecture for a modified neural network.

7. The method of claim 1 wherein the sampled networks comprise a largest possible neural network in the search space, a smallest possible neural network in the search space, and N randomly sampled neural networks from the search space.

8. The method of claim 7, wherein training the set of neural networks comprises:

training the largest possible neural network using target outputs from the training data; and training each neural network in the set other than the largest possible neural network using, as target outputs, outputs generated by the largest possible neural network during the training.

9. The method of claim 7, wherein training the set of neural networks comprises:

regularizing the largest possible neural network without regularizing any of the other neural networks in the set.

10. The method of claim 7 wherein the largest possible neural network has all of the parameters in the shared set of parameters.

11. The method of claim 7 wherein the smallest possible neural network has a smallest number of parameters of any neural network having an architecture in the search space.

12. The method of claim 1, wherein the respective architecture of each of the plurality of neural networks comprises one or more residual blocks, and wherein training the plurality of neural networks comprises:

initializing an output of each residual block to an all-zeros tensor.

13. The method of claim 1, wherein training the plurality of neural networks comprises:

training using a learning rate schedule that is exponentially decaying with constant ending.

14. The method of claim 1, wherein providing the selected neural network for performing inference on the particular set of one or more target hardware devices comprises deploying the selected neural network on the particular set of one or more target hardware devices without performing any additional training.

15. One or more non-transitory computer-readable storage media storing instructions that when executed by one or more computers cause the one or more computers to perform operations comprising:

receiving training data for a particular machine learning task;

generating trained values for a shared set of parameters by training a plurality of neural networks jointly on the training data, wherein each of the plurality of neural networks has parameters that are a subset of the shared set, wherein each of the plurality of neural networks has a respective architecture selected from a search space of different architectures, and wherein the search space is defined by a respective set of possible values for each of a plurality of architectural dimensions, and wherein the joint training comprises performing the following at each of a plurality of training steps:

obtaining training data for the training step;

sampling a plurality of neural networks of different sizes from the plurality of neural networks being trained, wherein each sampled neural network has a different subset of the shared set of parameters;

training the sampled neural networks on the training data for the training step to determine, for each sampled neural network, gradients with respect the respective subset of the shared set of parameters that are included in the sampled neural network; and aggregating the gradients determined for the set of neural networks to determine an update to the shared set of parameters, comprising, for each parameter that is shared between two or more of the sampled neural networks, aggregating the gradients with respect to the parameter for the two or more sampled neural networks;

determining a respective performance benchmark on the machine learning task for each of a subset of neural networks, each neural network in the subset having a different architecture selected from a proper subset of the search space of different architectures;

receiving data specifying one or more constraints on computational resource consumption for performing inference on one or more inputs for the particular machine learning task on a particular set of one or more target hardware devices; and selecting a neural network to be deployed for performing the machine learning task, comprising:

identifying, from the neural networks in the subset that satisfy the one or more constraints, an initial neural network based on the respective performance benchmarks;

generating a plurality of modified neural networks by perturbing the architecture of the identified initial neural network;

determining a respective performance benchmark on the particular machine learning task for each of the modified neural networks, and selecting, from the identified neural network and the plurality of modified neural networks generated by perturbing the architecture of the identified initial neural network, a neural network based on the respective performance benchmarks; and providing the selected neural network for performing inference on the particular set of one or more target hardware devices.

16. A system comprising one or more computers and one or more storage devices storing instructions that when executed by one or more computers are operable to cause the one or more computers to perform operations comprising:

receiving training data for a particular machine learning task;

generating trained values for a shared set of parameters by training a plurality of neural networks jointly on the training data, wherein each of the plurality of neural networks has parameters that are a subset of the shared set, wherein each of the plurality of neural networks has a respective architecture selected from a search space of different architectures, and wherein the search space is defined by a respective set of possible values for each of a plurality of architectural dimensions, and wherein the joint training comprises performing the following at each of a plurality of training steps:

obtaining training data for the training step;

sampling a plurality of neural networks of different sizes from the plurality of neural networks being trained, wherein each sampled neural network has a different subset of the shared set of parameters;

training the sampled neural networks on the training data for the training step to determine, for each sampled neural network, gradients with respect the respective subset of the shared set of parameters that are included in the sampled neural network; and aggregating the gradients determined for the set of neural networks to determine an update to the shared set of parameters, comprising, for each parameter that is shared between two or more of the sampled neural networks, aggregating the gradients with respect to the parameter for the two or more sampled neural networks;

determining a respective performance benchmark on the machine learning task for each of a subset of neural networks, each neural network in the subset having a different architecture selected from a proper subset of the search space of different architectures;

receiving data specifying one or more constraints on computational resource consumption for performing inference on one or more inputs for the particular machine learning task on a particular set of one or more target hardware devices; and selecting a neural network to be deployed for performing the machine learning task, comprising:

identifying, from the neural networks in the subset that satisfy the one or more constraints, an initial neural network based on the respective performance benchmarks;

generating a plurality of modified neural networks by perturbing the architecture of the identified initial neural network;

determining a respective performance benchmark on the particular machine learning task for each of the modified neural networks, and selecting, from the identified neural network and the plurality of modified neural networks generated by perturbing the architecture of the identified initial neural network, a neural network based on the respective performance benchmarks; and providing the selected neural network for performing inference on the particular set of one or more target hardware devices.

17. The system of claim 16, wherein the one or more constraints comprise one or more constraints on one or more of: floating point operations per second performed by a device when performing the task using the neural network, a memory footprint of the neural network when deployed on a device for performing the task, or a runtime latency of a device when performing an inference for an input or a batch of inputs using the neural network.

18. The system of claim 16, wherein the one or more constraints specify one or more of a maximum number of floating point operations per second or an acceptable range of memory consumed by a device when performing the task using the neural network, or a maximum latency or an acceptable latency range of a device when performing an inference for an input or a batch of inputs using the neural network.

19. The system of claim 16, wherein the constraint is a hardware-specific constraint on computational resource consumption for a particular device.

20. The system of claim 16, wherein providing the selected neural network for performing inference on the particular set of one or more target hardware devices comprises deploying the selected neural network with values of the parameters of the selected neural network that are the same as the trained values determined by training the plurality of neural networks jointly.

\* \* \* \* \*